United States Patent
Lai

(10) Patent No.: US 10,801,656 B2
(45) Date of Patent: Oct. 13, 2020

(54) PRESSURE REDUCING VALVE

(71) Applicant: Hung-Lin Lai, Changhua (TW)

(72) Inventor: Hung-Lin Lai, Changhua (TW)

(*) Notice: Subject to any disclaimer, the term of this patent is extended or adjusted under 35 U.S.C. 154(b) by 48 days.

(21) Appl. No.: 16/209,728

(22) Filed: Dec. 4, 2018

(65) Prior Publication Data

US 2020/0173595 A1  Jun. 4, 2020

(51) Int. Cl.
*F16L 55/053* (2006.01)
*F15B 1/24* (2006.01)

(52) U.S. Cl.
CPC .......... *F16L 55/053* (2013.01); *F15B 1/24* (2013.01); *F15B 2201/205* (2013.01); *F15B 2201/312* (2013.01); *F15B 2201/4056* (2013.01)

(58) Field of Classification Search
CPC ..... F16L 41/021; F16L 55/045; F16L 55/053; F15B 1/24; F15B 2201/205; F15B 2201/312; F15B 2201/4056
USPC ....... 138/30, 31; 137/207, 798, 625.47, 887; 251/148; 285/133.4, 133.11, 39
See application file for complete search history.

(56) References Cited

U.S. PATENT DOCUMENTS

| | | | | |
|---|---|---|---|---|
| 2,399,275 A * | 4/1946 | Wenk | ...................... | F16L 19/04 285/133.4 |
| 3,633,627 A * | 1/1972 | Perrott | ...................... | F15B 1/24 138/31 |
| 5,031,664 A * | 7/1991 | Alaze | ...................... | F15B 1/24 138/26 |
| 5,213,375 A * | 5/1993 | Wu | ...................... | F16L 19/062 285/322 |
| 6,095,195 A * | 8/2000 | Park | ...................... | F16L 55/053 138/31 |
| 6,154,961 A * | 12/2000 | Park | ...................... | B23P 15/00 29/890.14 |
| 7,520,292 B2 * | 4/2009 | Weltman | ................. | F16K 13/00 137/118.05 |
| 9,970,583 B2 * | 5/2018 | McCoy | ................. | F16L 55/053 |
| 10,557,585 B2 * | 2/2020 | Whitney, Jr. | ......... | F16L 55/053 |

* cited by examiner

*Primary Examiner* — Patrick F Brinson
(74) *Attorney, Agent, or Firm* — Che-Yang Chen; Law Office of Michael Chen

(57) ABSTRACT

A pressure reducing valve may include a valve body, a connecting tube, and a pressure-reducing member. The valve body is a three-way intercommunicated valve body which respectively forms into a water inlet end, a water outlet end, and a pressure-reducing tube. The connecting tube is connected to an extending section thereof, and at least a first annular groove is formed at an outer periphery of the extending section for disposing an O-ring thereon. An annular surface formed between the connecting tube and the extending section is faced to the extending section. The pressure-reducing member is hollow and has a closed end and an open end, and a buffer block is installed therein. The open end is abutted against the annular surface of the extending section, and a coupled portion between the open end and the annular surface is welded together to form a welding portion therebetween.

4 Claims, 6 Drawing Sheets

PRESSURE REDUCING VALVE

FIELD OF THE INVENTION

The present invention relates to a pressure reducing valve and more particularly to an anti-leaking pressure reducing valve for solving the problem of water hammer.

BACKGROUND OF THE INVENTION

Generally, water hammer is a pressure caused when a fluid is suddenly forced to stop such as a valve been closed suddenly at an end of a pipeline system, and a pressure generates in the pipe. The water hammer can cause major problems in features of the pipeline system such as the malfunction of valve operation, and loosing, leakage or damage of pipe joints. A common way to solve the problem of water hammer is to install a pressure reducing valve in the pipeline. The pressure reducing valve comprises a shell, and a valve body installed therein is configured to form an airtight room in the shell. When water hammer happens, the valve body is pressed to compress the airtight room, thereby absorbing the pressure propagating in the pipe.

However, the conventional water valve is disadvantageous because: when the pressure reducing valve is installed in the pipeline, the shell is installed in the pipe through a connecting tube, and the connection between the connecting tube and the pipe is usually achieved through rolling processing to tighten the shell so as to tightly couple on the connecting tube. Nevertheless, the connecting method mentioned above is weak in pressure resistance and easily causes leakage and even damage of the valve or the pipeline. Therefore, there remains a need for a new and improved design for a pressure reducing valve to overcome the problems presented above.

SUMMARY OF THE INVENTION

The present invention provides a pressure reducing valve which comprises a valve body, a connecting tube, and a pressure-reducing member. The valve body is a three-way intercommunicated valve body which respectively forms into a water inlet end, a water outlet end, and a pressure-reducing tube, and the water inlet end and the water outlet end are configured to connect to two outside tubes respectively. The connecting tube is connected to an extending section at an end thereof, and at least a first annular groove is formed at an outer periphery of the extending section, and an O-ring is disposed on the first annular groove. An annular surface formed between the connecting tube and the extending section is faced to the extending section, and the other end of the connecting tube is secured at the pressure-reducing tube of the valve body so as to enable the water inlet end and the water outlet end to communicate with the connecting tube. Moreover, an anti-leaking ring is disposed between the connecting tube and the pressure-reducing tube. The pressure-reducing member is hollow and has a closed end and an open end, and a buffer block is installed inside the pressure-reducing member. The buffer block has a plurality of second annular grooves formed at an outer periphery thereof, and a plurality of elastic rings are respectively disposed on the second annular grooves. A pressure-reducing room is provided inside the pressure-reducing member through the elastic rings and the buffer block blocking the open end of the pressure-reducing member. The open end of the pressure-reducing member is disposed on the extending section of the connecting tube, and the O-ring is abutted against an inner surface of the pressure-reducing member. The open end of the pressure-reducing member is abutted against the annular surface of the extending section, and a coupled portion between the open end and the annular surface is welded together to form a welding portion therebetween.

In one embodiment, the pressure-reducing tube has a first outer threaded section, and the connecting tube comprises a second inner threaded section which is configured to engage with the first outer threaded section of the pressure-reducing tube.

In another embodiment, the pressure-reducing tube has a first inner threaded section, and the connecting tube comprises a second outer threaded section which is configured to engage with the first inner threaded section of the pressure-reducing tube.

In still another embodiment, the buffer block comprises a housing which has an opening faced to the connecting tube, and water pressure generated from water hammer is configured to act on the housing.

In a further embodiment, an abutting surface formed at the opening of the housing is adapted to abut against an end of the extending section so as to limit the displacement of the buffer block.

In still a further embodiment, the extending section of the connecting tube is inserted into the pressure-reducing member with a designed depth, so that the elastic rings on the buffer block are positioned away from the welding portion, which prevents the elastic rings from being damaged during the welding process.

Comparing with conventional pressure reducing valve, the present invention is advantageous because: (i) the open end of the pressure-reducing member is disposed on the extending section of the connecting tube, and the O-ring on the first annular groove is abutted against the inner surface of the pressure-reducing member, thereby achieving the sealing effect between the connecting tube and the pressure-reducing member; and (ii) the open end of the pressure-reducing member is abutted against the annular surface of the connecting tube, and the coupled portion between the open end and the annular surface is welded together to form the welding portion therebetween; wherein the welding portion is configured to secure the connection between the pressure-reducing member and the connecting tube, and the extending section is inserted into the pressure-reducing member to push the abutting surface of the buffer block away from the open end of the pressure-reducing member with the designed depth such that the elastic rings on the buffer block are positioned away from the welding portion, thereby preventing the elastic rings from being damaged during the welding process.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
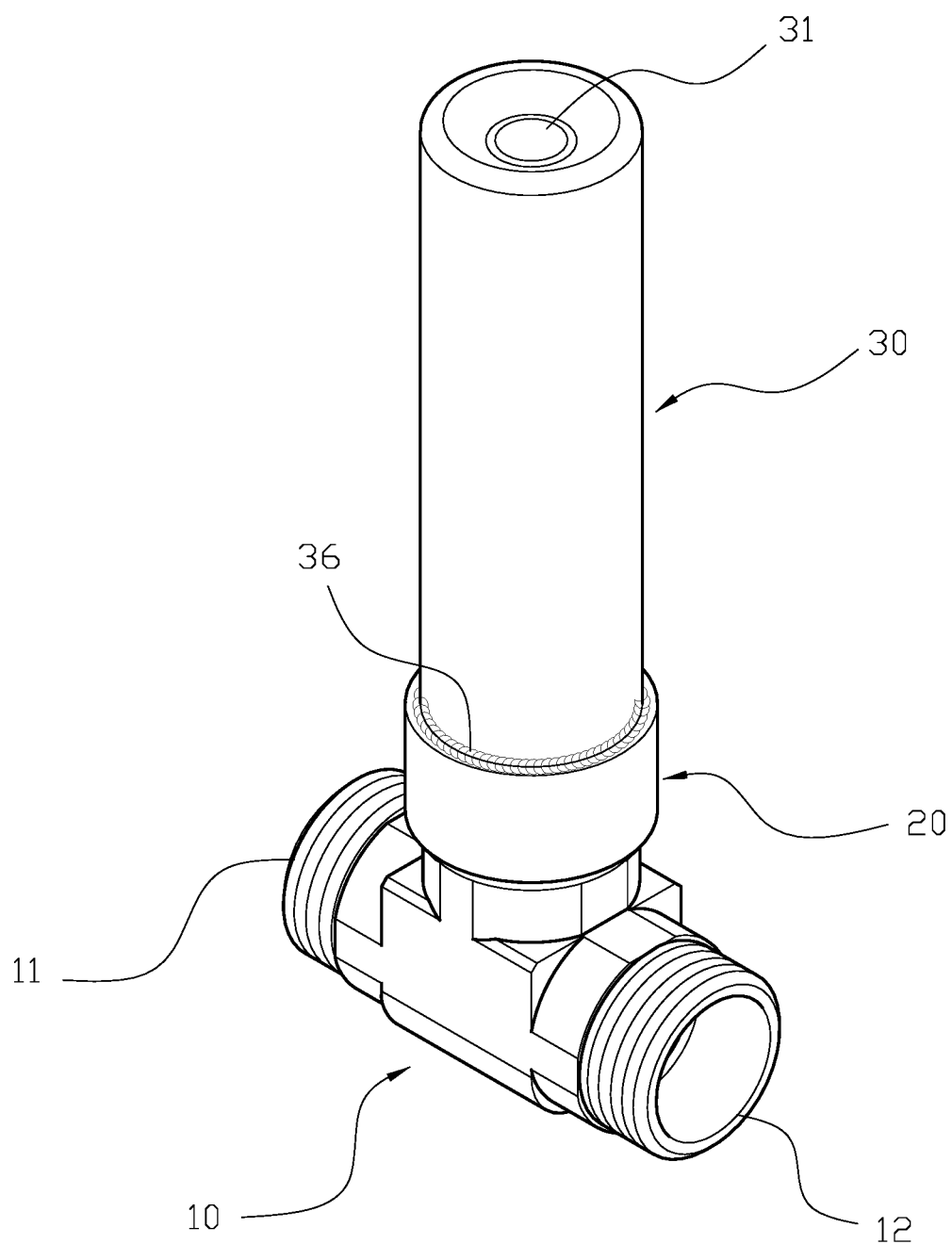
FIG. 1 is a three-dimensional assembly view of a pressure reducing valve of the present invention.
Figure 2:
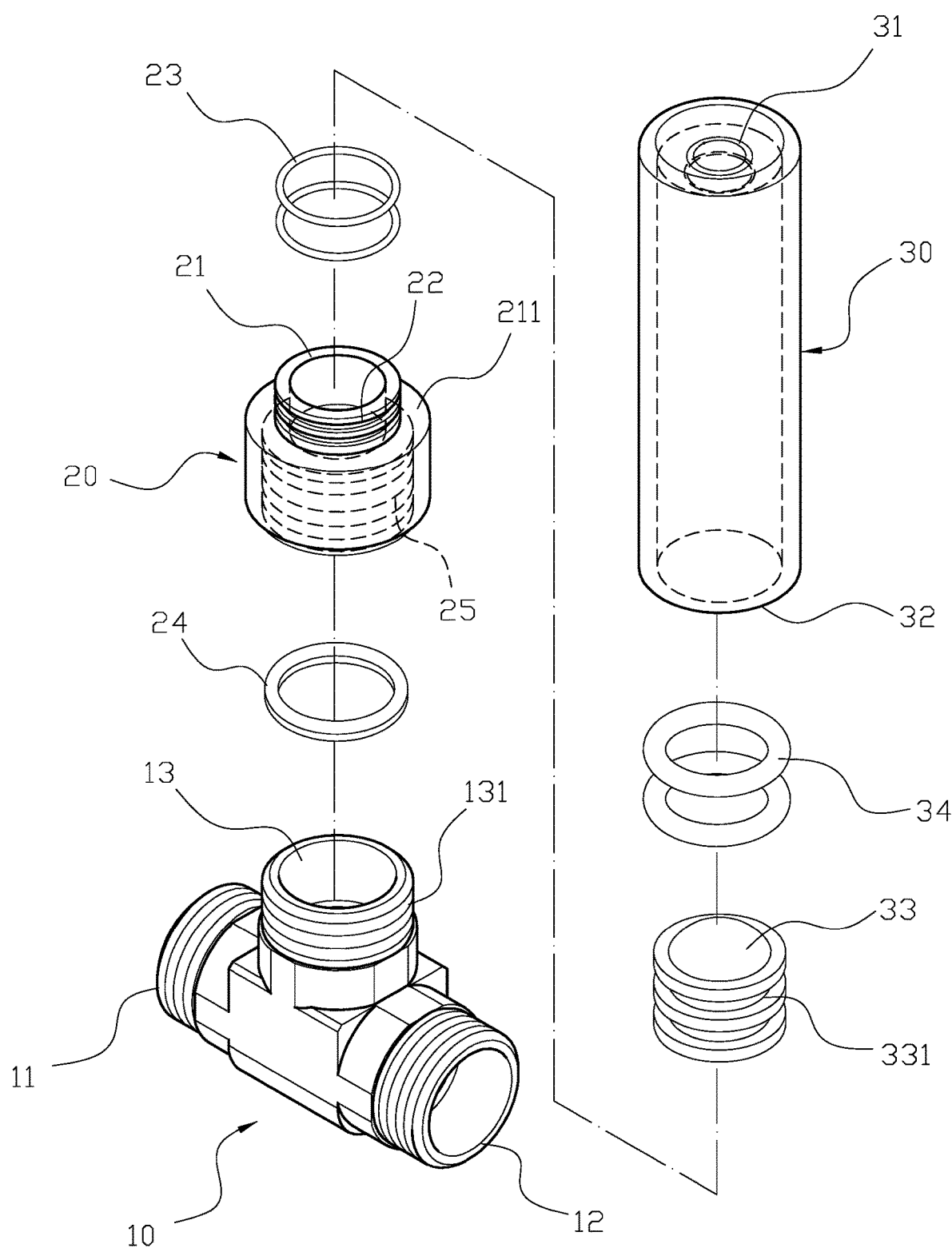
FIG. 2 is a three-dimensional exploded view of the pressure reducing valve of the present invention.
Figure 3:
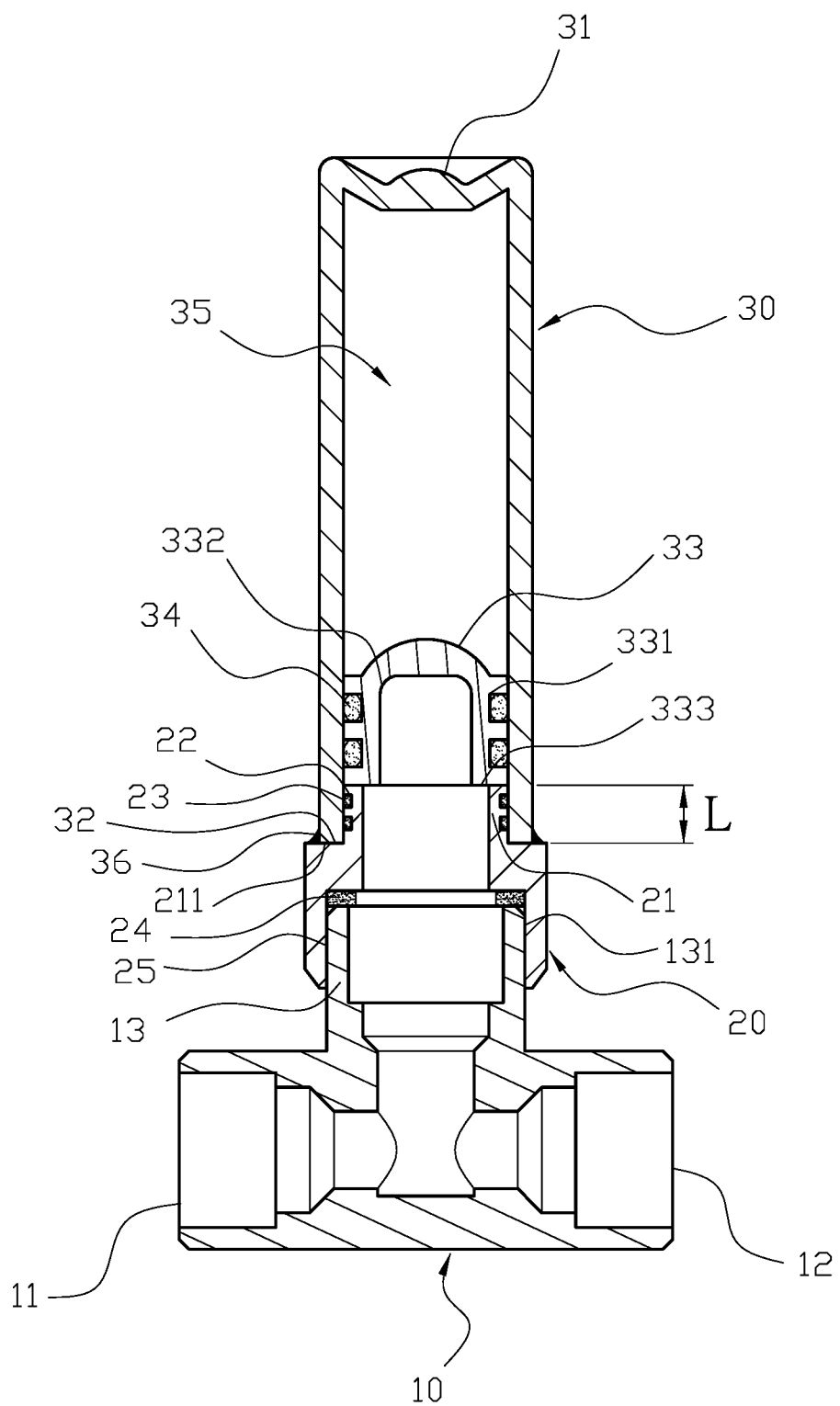
FIG. 3 is a sectional view of the pressure reducing valve of the present invention.

In order to further understand the goal, characteristics and effect of the present invention, a number of embodiments along with the drawings are illustrated as following:

Referring to FIGS. 1 to 3, the present invention provides a pressure reducing valve which comprises a valve body (10), a connecting tube (20), and a pressure-reducing member (30). The valve body (10) is a three-way intercommunicated valve body which respectively forms into a water inlet end (11), a water outlet end (12), and a pressure-reducing tube (13), and the water inlet end (11) and the water outlet end (12) are configured to connect to two outside tubes respectively. The connecting tube (20) is connected to an extending section (21) at an end thereof, and at least a first annular groove (22) is formed at an outer periphery of the extending section (21), and an O-ring (23) is disposed on the first annular groove (22). An annular surface (211) formed between the connecting tube (20) and the extending section (21) is faced to the extending section (21), and the other end of the connecting tube (20) is secured at the pressure-reducing tube (13) of the valve body (10) so as to enable the water inlet end (11) and the water outlet end (12) to communicate with the connecting tube (20). Moreover, an anti-leaking ring (24) is disposed between the connecting tube (20) and the pressure-reducing tube (13). The pressure-reducing tube (13) has a first outer threaded section (131), and the connecting tube (20) comprises a second inner threaded section (25) which is configured to engage with the first outer threaded section (131) of the pressure-reducing tube (13). The pressure-reducing member (30) is hollow and has a closed end (31) and an open end (32), and a buffer block (33) is installed inside the pressure-reducing member (30). The buffer block (33) has a plurality of second annular grooves (331) formed at an outer periphery thereof, and a plurality of elastic rings (34) are respectively disposed on the second annular grooves (331). A pressure-reducing room (35) is provided inside the pressure-reducing member (30) through the elastic rings (34) and the buffer block (33) blocking the open end (32) of the pressure-reducing member (30). The buffer block (33) comprises a housing (332) which has an opening faced to the connecting tube (20), and water pressure generated from water hammer is configured to act on the housing (332) and move the buffer block (33) toward the closed end (32) of the pressure-reducing member (30). Moreover, the open end (32) of the pressure-reducing member (30) is disposed on the extending section (21) of the connecting tube (20), and the O-ring is abutted against an inner surface of the pressure-reducing member (30). An abutting surface (333) formed at the opening of the housing (332) is adapted to abut against an end of the extending section (21) so as to limit the displacement of the buffer block (33). Furthermore, the open end (32) of the pressure-reducing member (30) is abutted against the annular surface (211) of the extending section (21), and a coupled portion between the open end (32) and the annular surface (211) is welded together to form a welding portion (36) therebetween. Additionally, the extending section (21) of the connecting tube (20) is inserted into the pressure-reducing member (30) with a designed depth (L), so that the elastic rings (34) on the buffer block (33) are positioned away from the welding portion (36), which prevents the elastic rings (34) from being damaged during the welding process. With the welding portion (36) secured between the connecting tube (20) and the pressure-reducing member (30), the pressure reducing valve is improved in anti-leaking, service life, and resistance for water hammer.

Structurally, referring to FIGS. 1 to 3, the elastic rings (34) are disposed on the second annular grooves (331) of the buffer block (33), and the buffer block (33) is positioned into the pressure-reducing member (30) through the open end (32) thereof, and the opening of the housing (332) of the buffer block (33) is faced outwardly. The elastic rings (34) of the buffer block (33) are abutted against the inner surface of the pressure-reducing member (30) so as to air-tightly form the pressure-reducing room (35) inside the pressure-reducing member (30). The open end (32) of the pressure-reducing member (30) is disposed on the extending section (21) of the connecting tube (20), and the O-ring (23) on the first annular groove (22) is abutted against the inner surface of the pressure-reducing member (30), thereby achieving the sealing effect between the connecting tube (20) and the pressure-reducing member (30). Also, the open end (32) of the pressure-reducing member (30) is abutted against the annular surface (211) of the connecting tube (20), and the coupled portion between the open end (32) and the annular surface (211) is welded together to form the welding portion (36) therebetween. The welding portion (36) is configured to secure the connection between the pressure-reducing member (30) and the connecting tube (20), and the extending section (21) is inserted into the pressure-reducing member (30) to push the abutting surface (333) of the buffer block (33) away from the open end (32) of the pressure-reducing member (30) with the depth (L) such that the elastic rings (34) on the buffer block (33) are positioned away from the welding portion (36), thereby preventing the elastic rings (34) from being damaged during the welding process.

Figure 4:
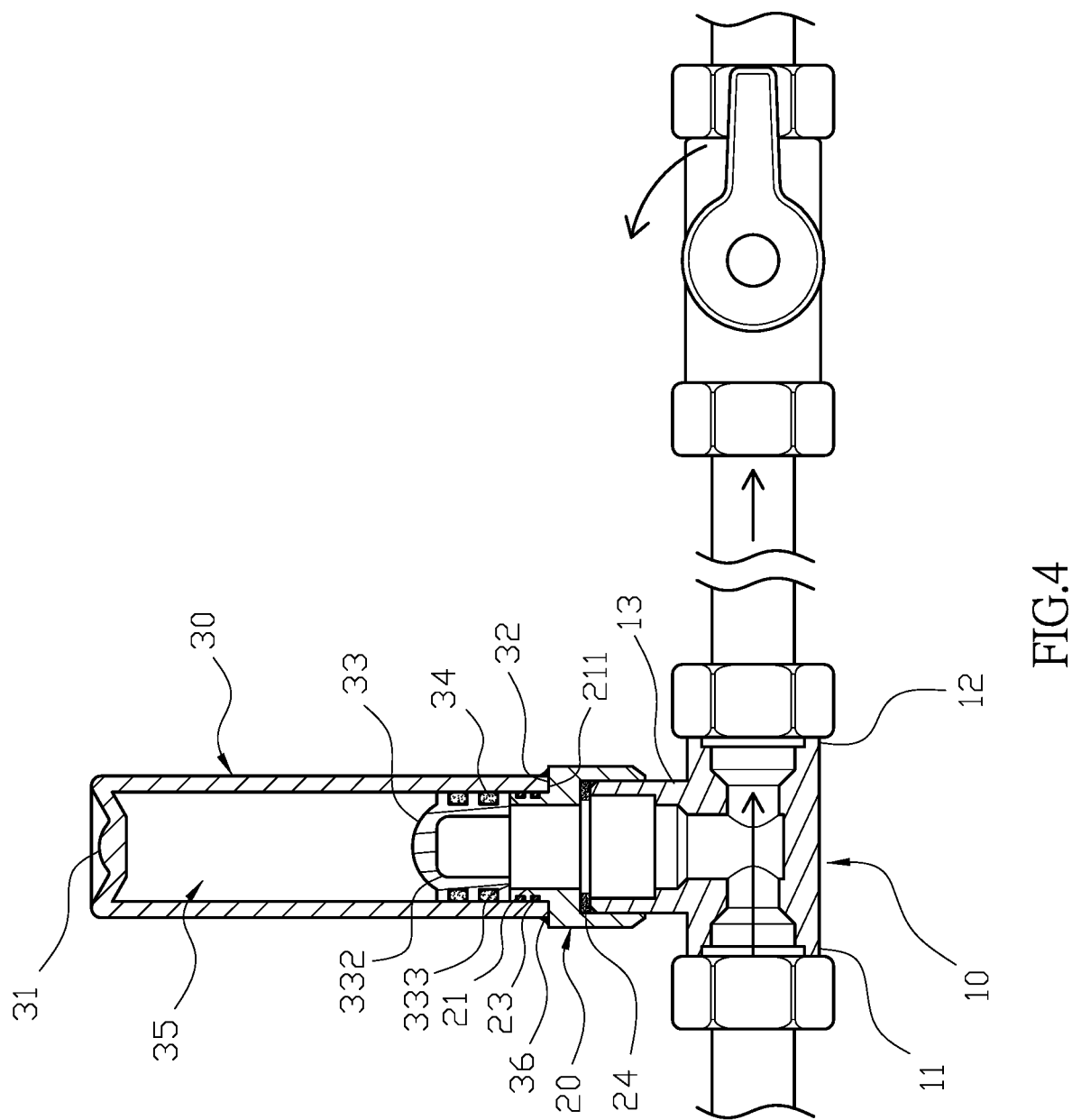
FIG. 4 is a schematic view illustrating the pressure reducing valve of the present invention is turned on and water flows therein.
Figure 5:
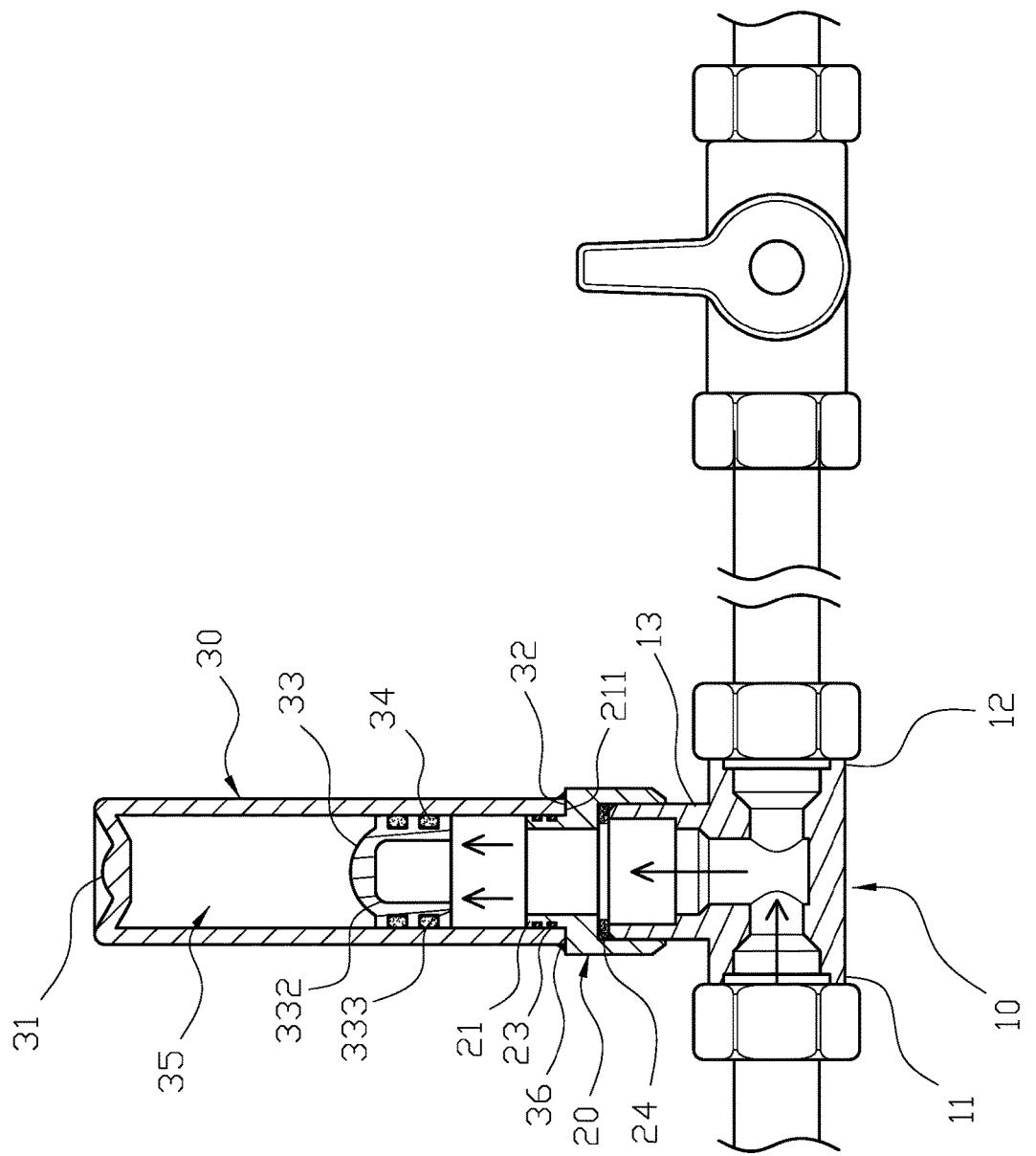
FIG. 5 is a schematic view illustrating the pressure reducing valve of the present invention is suddenly closed and water hammer happens in the pressure reducing valve.

In actual application, referring to FIGS. 4 and 5, the pressure-reducing member (30) is secured with the connecting tube (20) which is engaged with the pressure-reducing tube (13) of the valve body (10), and the anti-leaking ring (24) is disposed between the pressure-reducing tube (13) and the connecting tube (20) to achieve the effect of anti-leaking between the valve body (10) and the connecting tube (20).

Also, the water inlet end (11) and the water outlet end (12) of the valve body (10) are respectively connected to the two outside tubes for receiving water source and providing water supply for use. When water source is suddenly cut and water hammer happens, the generated water pressure is configured to act on the housing (332), and the buffer block (33) is pushed to compress the pressure-reducing room (35) of the pressure-reducing member (30) so as to absorb the pressure from water hammer. Moreover, the coupled portion between the connecting tube (20) and pressure-reducing member (30) is welded to form the welding portion (36) so as to improve the structural strength of the pressure reducing valve of the present invention.

Figure 6:
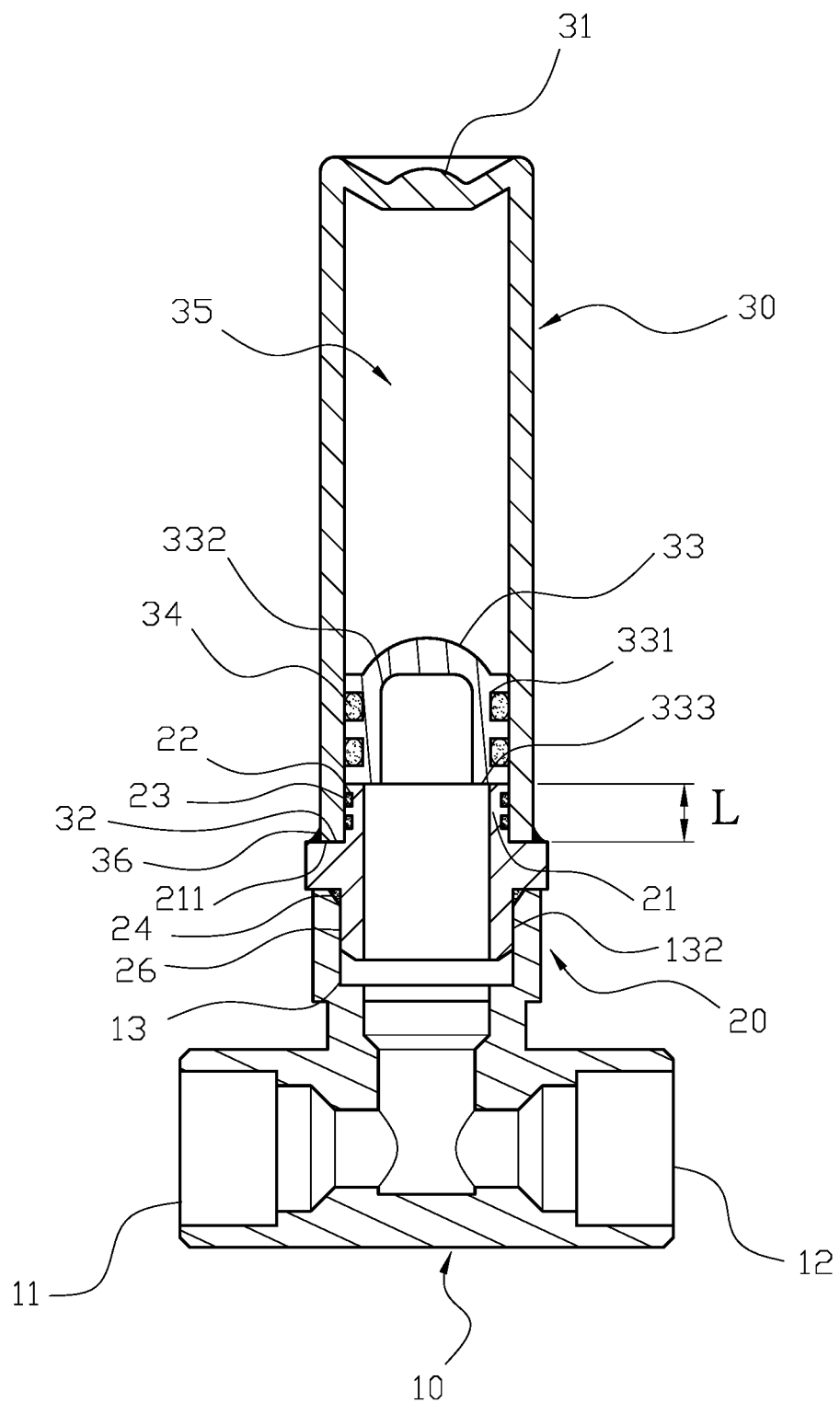
FIG. 6 is a sectional view of another embodiment of the pressure reducing valve of the present invention.

In another embodiment, referring to FIG. 6, the pressure-reducing tube (13) has a first inner threaded section (132), and the connecting tube (20) comprises a second outer threaded section (26) which is configured to engage with the first inner threaded section (132) of the pressure-reducing tube (13).

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A pressure reducing valve comprising,
a valve body being a three-way intercommunicated valve body which respectively forms into a water inlet end, a water outlet end, and a pressure-reducing tube, and the water inlet end and the water outlet end configured to connect to two outside tubes respectively for water flowing in and out of the pressure reducing valve;
a connecting tube connected to an extending section at an end thereof, and at least a first annular groove formed at an outer periphery of the extending section, and an O-ring disposed on the first annular groove; an annular surface, which is formed between the connecting tube and the extending section, faced to the extending section, and the other end of the connecting tube secured at the pressure-reducing tube of the valve body so as to enable the water inlet end and the water outlet end to communicate with the connecting tube; an anti-leaking ring disposed between the connecting tube and the pressure-reducing tube; and
a pressure-reducing member being hollow and having a closed end and an open end, and a buffer block installed inside the pressure-reducing member; the buffer block having a plurality of second annular grooves formed at an outer periphery thereof, and a plurality of elastic rings respectively disposed on the second annular grooves; a pressure-reducing room provided inside the pressure-reducing member through the elastic rings and the buffer block blocking the open end of the pressure-reducing member; the open end of the pressure-reducing member disposed on the extending section of the connecting tube, and the O-ring abutted against an inner surface of the pressure-reducing member; the open end of the pressure-reducing member abutted against the annular surface of the extending section, and a coupled portion, which is located between the open end and the annular surface, welded together to form a welding portion therebetween, thereby improving the structural strength and service life of the pressure reducing valve,
wherein the buffer block comprises a housing which has an opening faced to the connecting tube, and water pressure generated from water hammer is configured to act on the housing, and
wherein an abutting surface formed at the opening of the housing is adapted to abut against an end of the extending section so as to limit the displacement of the buffer block.

2. The pressure reducing valve of claim 1, wherein the pressure-reducing tube has a first outer threaded section, and the connecting tube comprises a second inner threaded section which is configured to engage with the first outer threaded section of the pressure-reducing tube.

3. The pressure reducing valve of claim 1, wherein the pressure-reducing tube has a first inner threaded section, and the connecting tube comprises a second outer threaded section which is configured to engage with the first inner threaded section of the pressure-reducing tube.

4. The pressure reducing valve of claim 1, wherein the extending section of the connecting tube is inserted into the pressure-reducing member with a designed depth, so that the elastic rings on the buffer block are positioned away from the welding portion, which prevents the elastic rings from being damaged during the welding process.

* * * * *